(No Model.) 9 Sheets—Sheet 1.
P. FRASER.
MACHINE FOR MAKING SPIRAL SPRINGS.
No. 481,395. Patented Aug. 23, 1892.
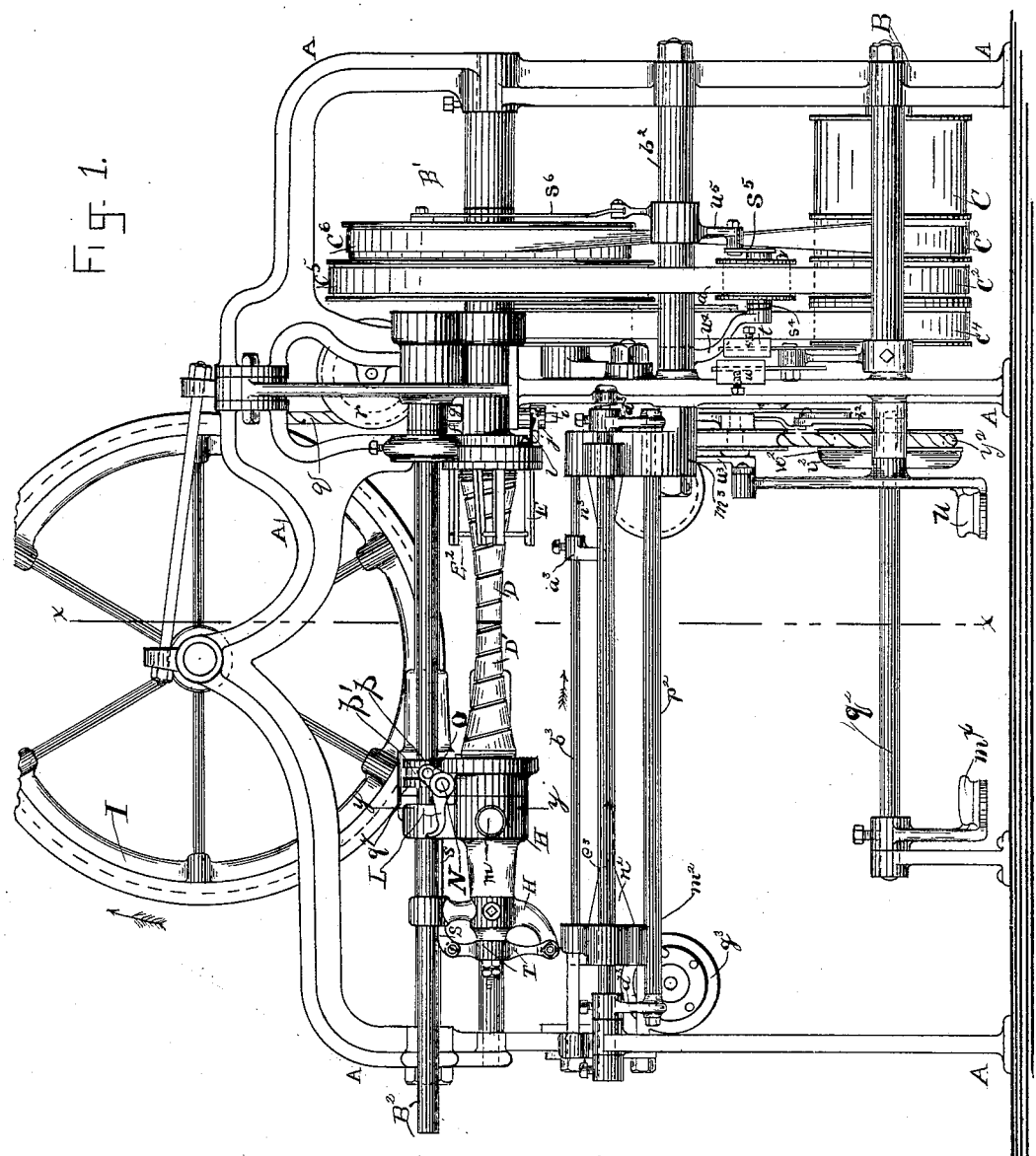
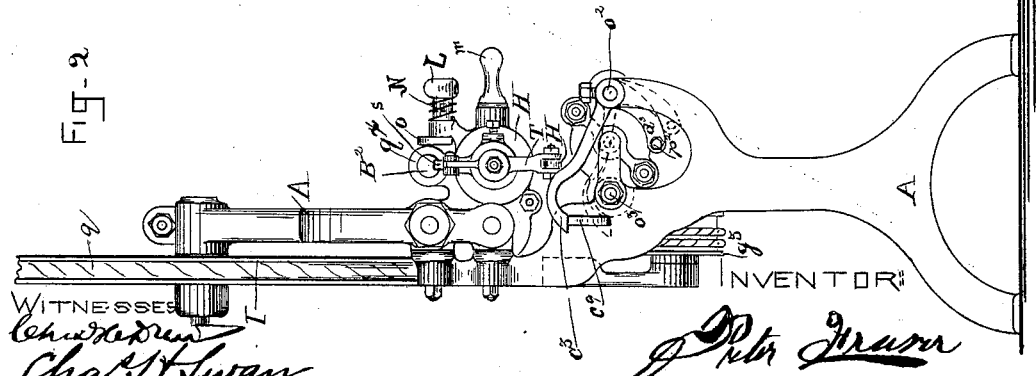

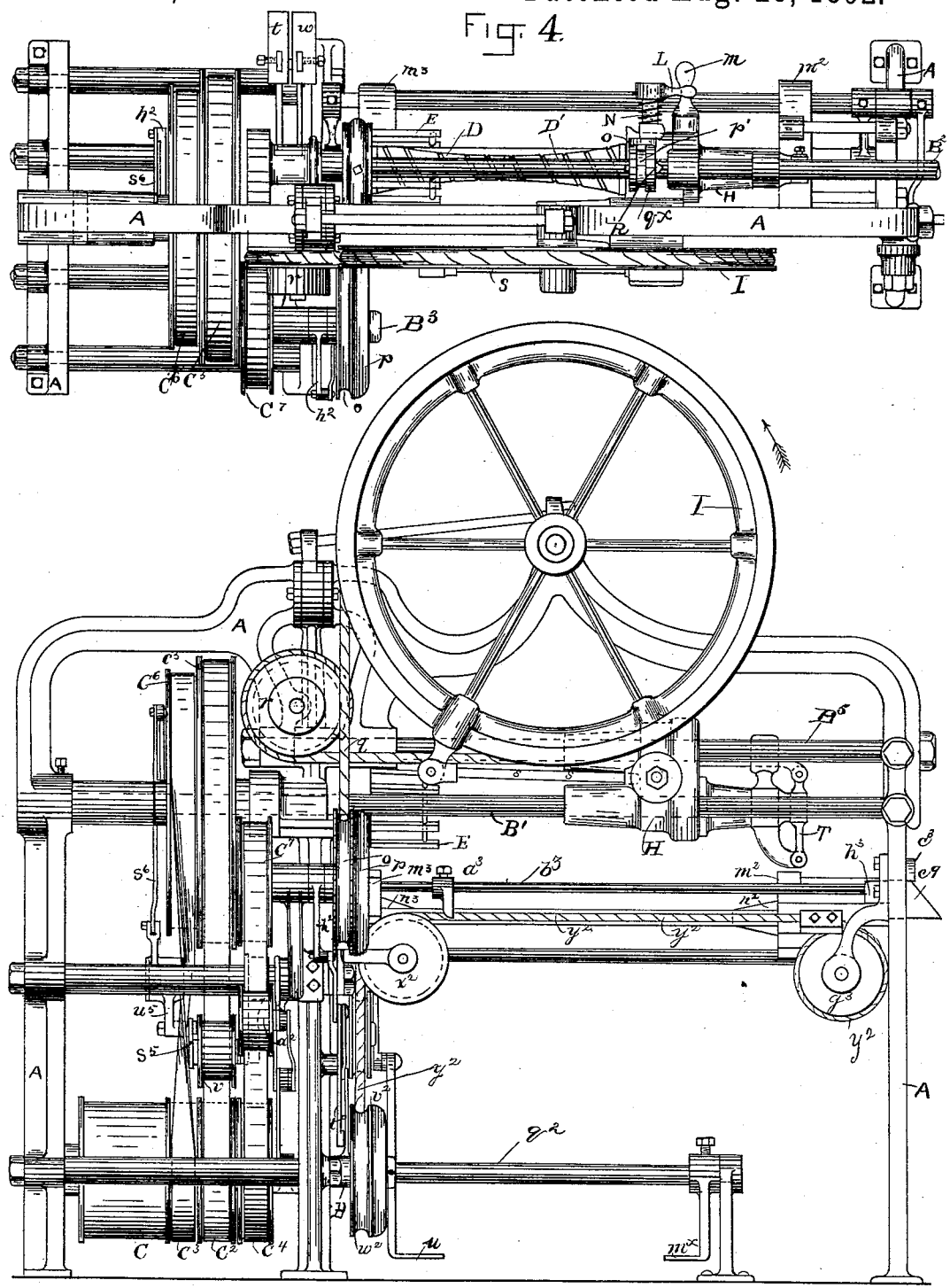

(No Model.) 9 Sheets—Sheet 3.
P. FRASER.
MACHINE FOR MAKING SPIRAL SPRINGS.
No. 481,395. Patented Aug. 23, 1892.
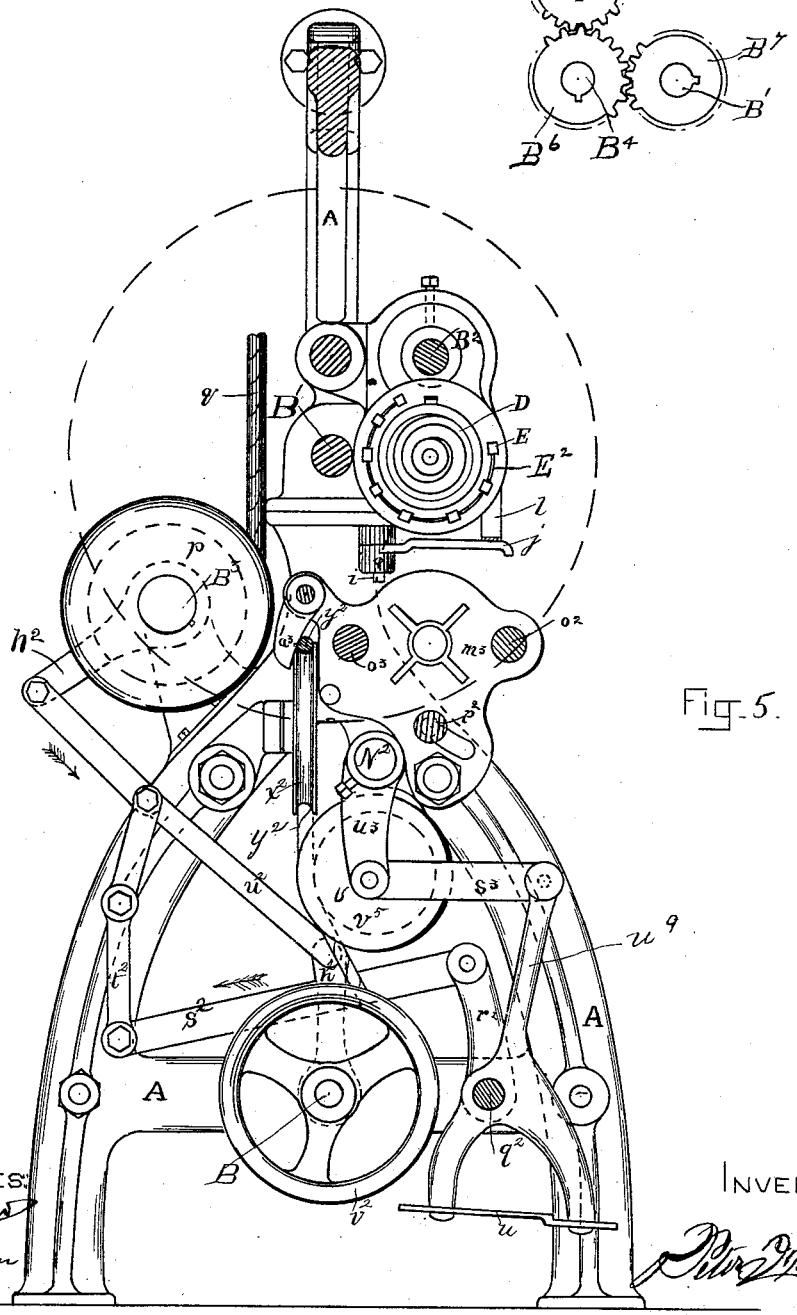

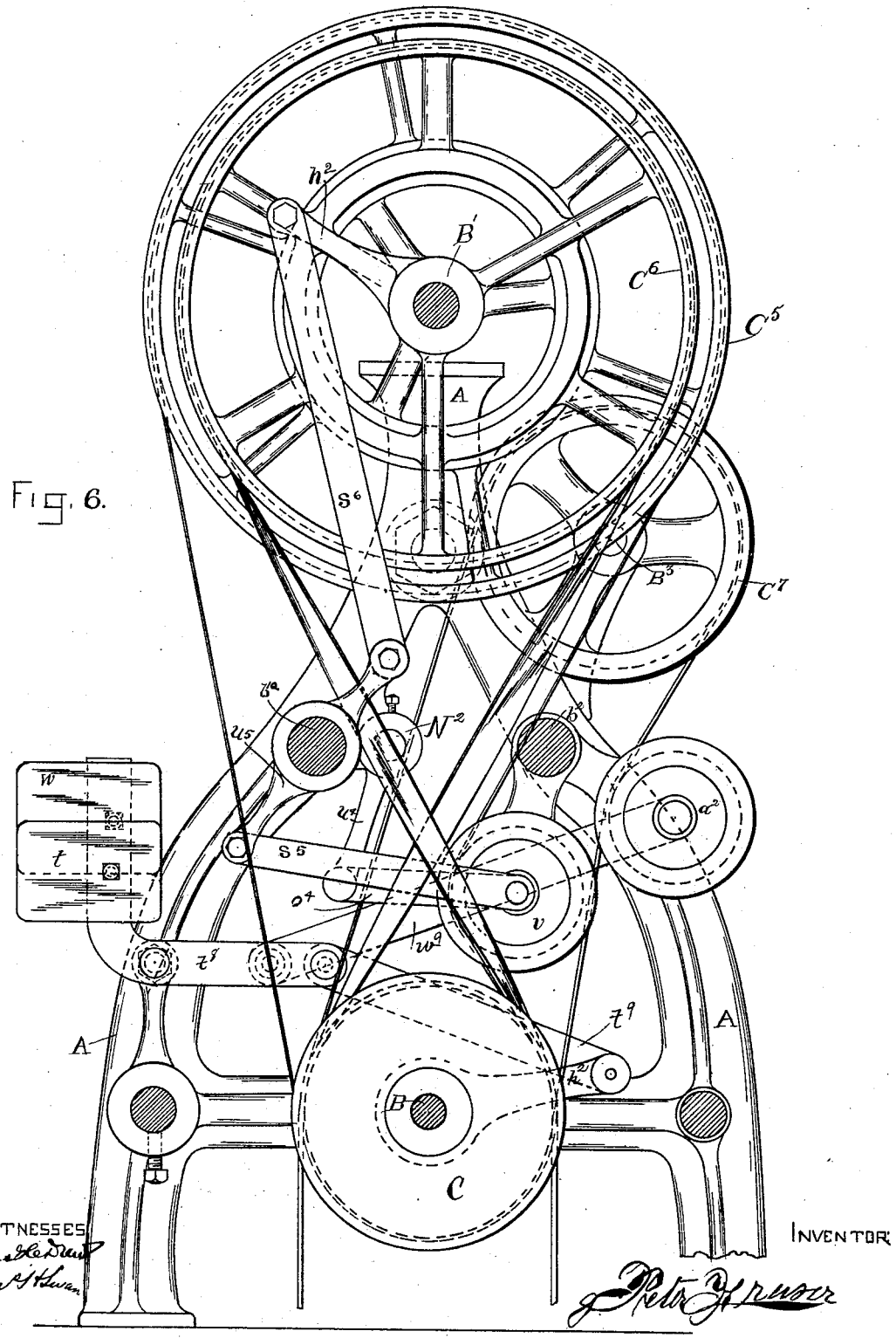

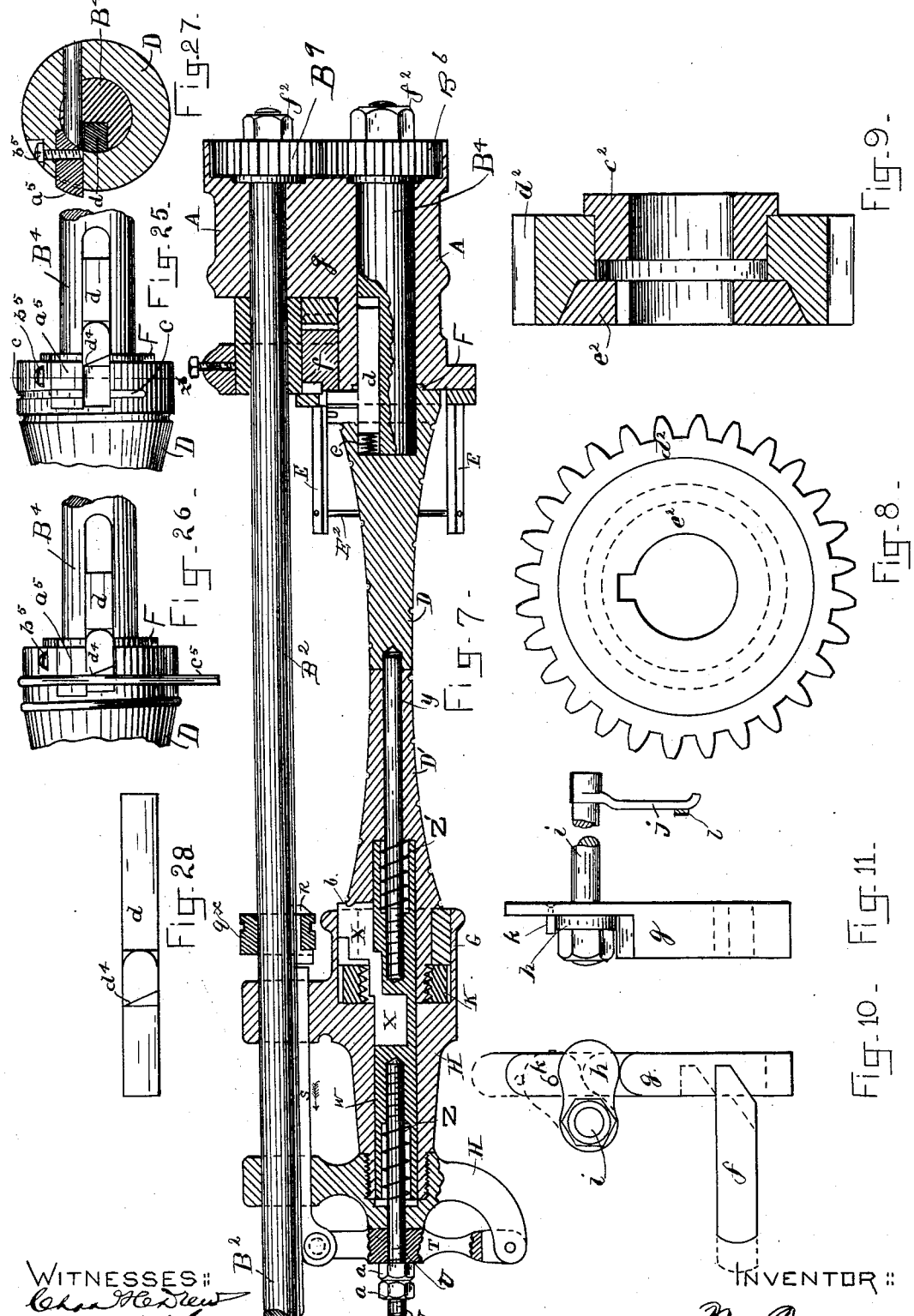

(No Model.) 9 Sheets—Sheet 6.
P. FRASER.
MACHINE FOR MAKING SPIRAL SPRINGS.
No. 481,395. Patented Aug. 23, 1892.
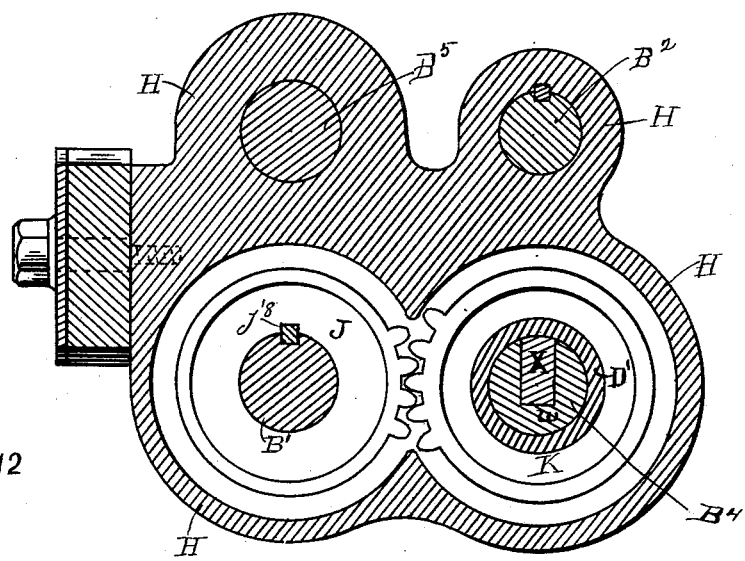
Fig. 12
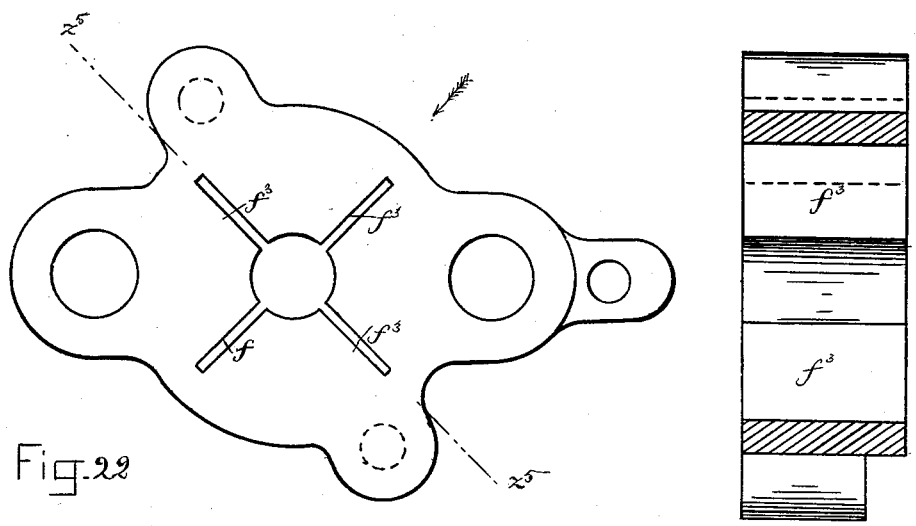
Fig. 22
Fig. 23.
WITNESSES:
INVENTOR:

(No Model.)  9 Sheets—Sheet 7.

P. FRASER.
MACHINE FOR MAKING SPIRAL SPRINGS.

No. 481,395.  Patented Aug. 23, 1892.

WITNESSES:  INVENTOR:

(No Model.) 9 Sheets—Sheet 8.

P. FRASER.
MACHINE FOR MAKING SPIRAL SPRINGS.

No. 481,395. Patented Aug. 23, 1892.

WITNESSES:
Chas. M. Drew
Chas. H. Swan

INVENTOR:
Peter Fraser (No Model.) 9 Sheets—Sheet 9.
P. FRASER.
MACHINE FOR MAKING SPIRAL SPRINGS.
No. 481,395. Patented Aug. 23, 1892.
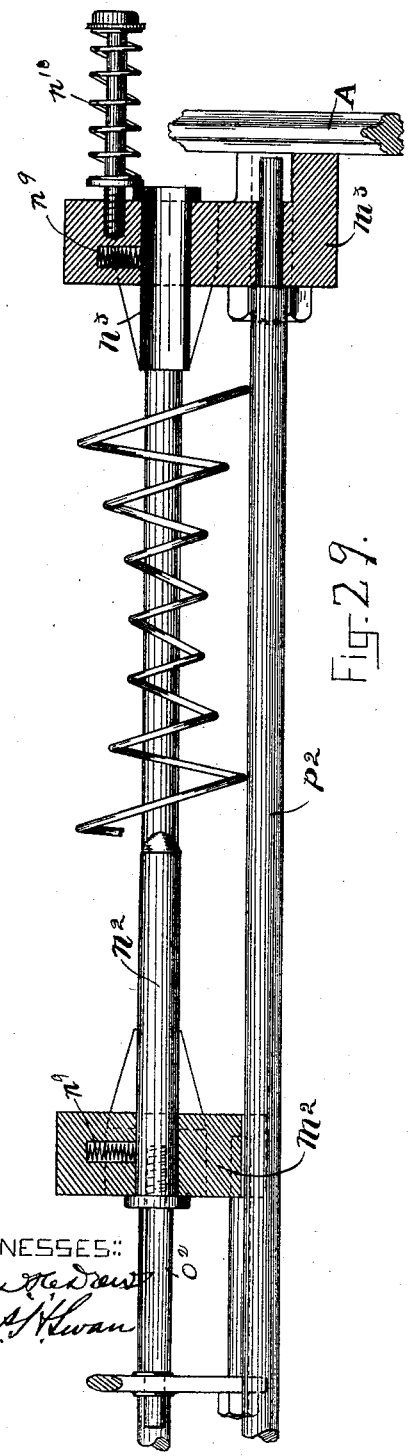
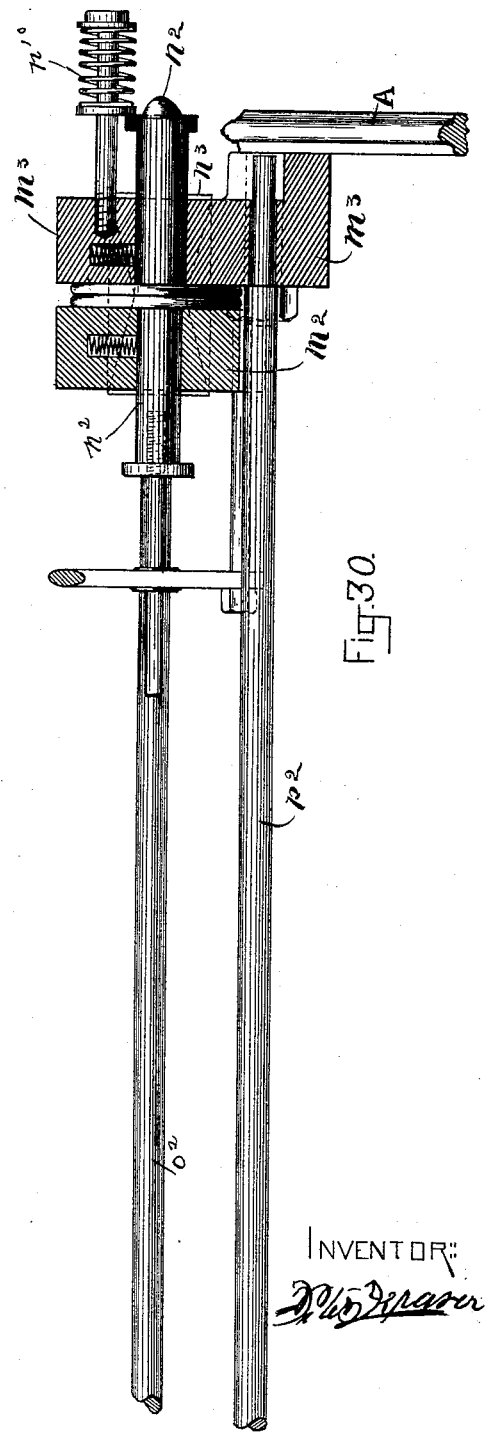

UNITED STATES PATENT OFFICE.

PETER FRASER, OF PLYMOUTH, MASSACHUSETTS, ASSIGNOR TO THE ATLAS TACK CORPORATION, OF MASSACHUSETTS.

MACHINE FOR MAKING SPIRAL SPRINGS.

SPECIFICATION forming part of Letters Patent No. 481,395, dated August 23, 1892.

Application filed August 7, 1891. Serial No. 402,053. (No model.)

*To all whom it may concern:*

Be it known that I, PETER FRASER, a subject of the Queen of England, residing at Plymouth, in the county of Plymouth and State of Massachusetts, have invented certain new and useful Improvements in Machines for Making Spiral Springs; and I do hereby declare the following to be a full, clear, and exact description of the same, reference being had to the accompanying drawings, forming a part of this specification, and to the letters of reference marked thereon.

This invention relates to machines for making wire springs for furniture, upholstering, bed-bottoms, &c., and has for its object to provide a machine of this character of simple design, in which the springs may be formed completely and more rapidly than heretofore possible.

A further object of the invention is to reduce to the minimum the labor necessary in running and handling the machine in the formation of springs.

To the above ends the invention consists in certain novel details of construction and combinations and arrangements of parts, all as will be hereinafter described, and pointed out particularly in the appended claims.

Figure 13:
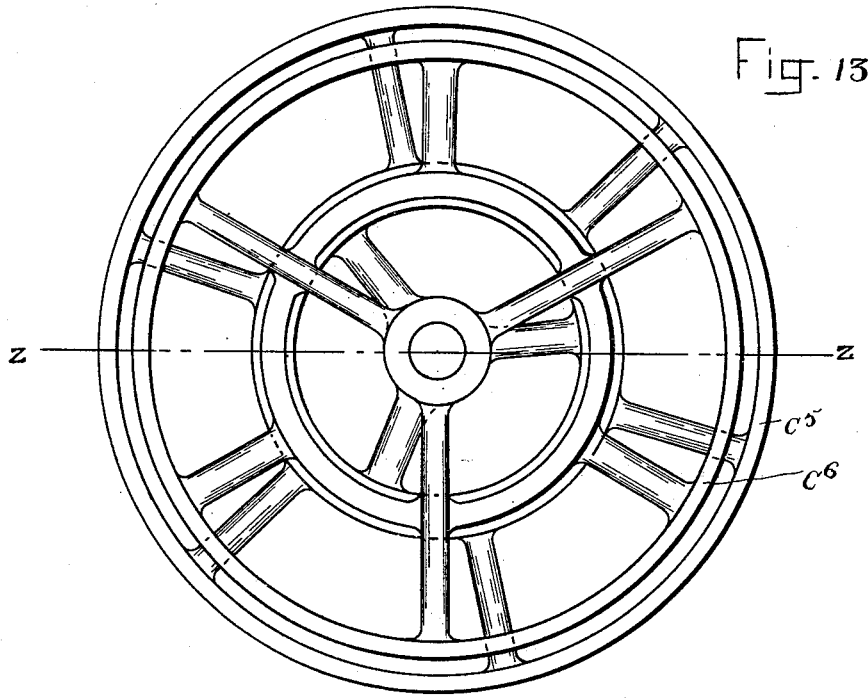
Figure 14:
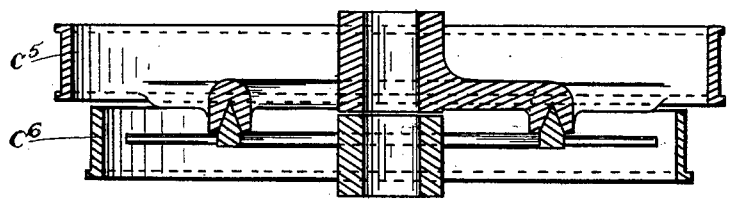
Figure 15:
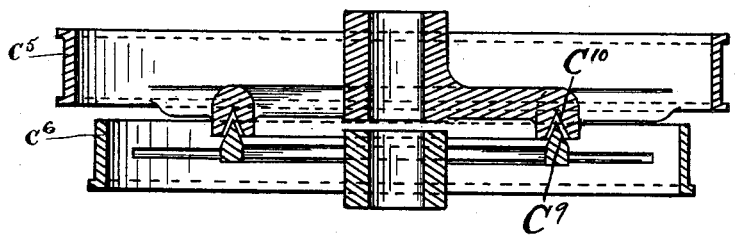
Figure 16:
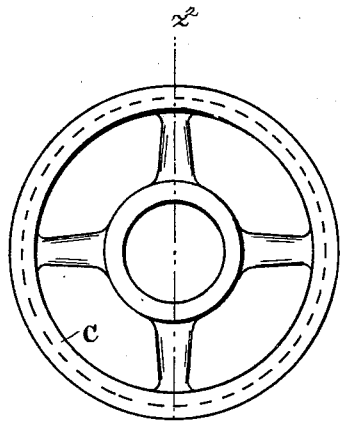
Figure 17:
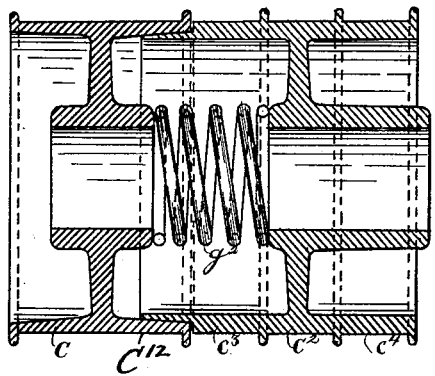
Figure 18:
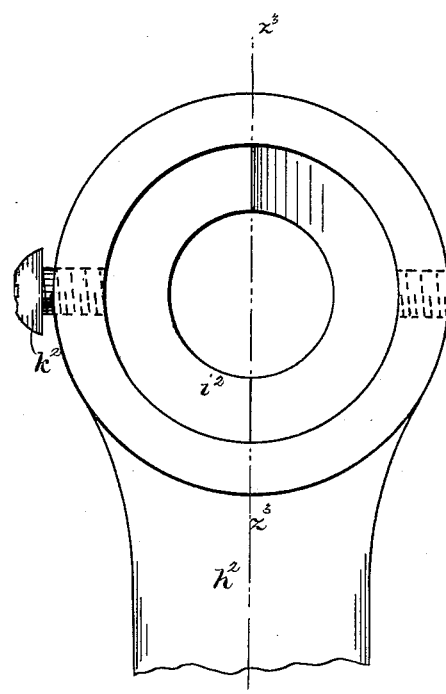
Figures 19, 20:
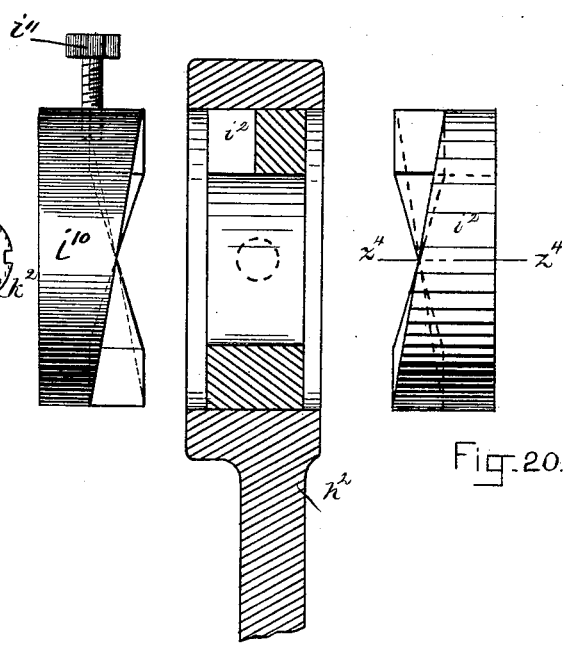
Figure 21:
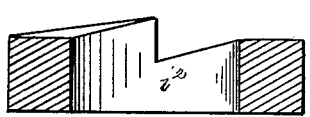

Referring to the accompanying drawings, Figure 1 is a front elevation of a machine constructed in accordance with my present invention. Fig. 2 is an elevation looking at the left-hand end of the machine. Fig. 3 is a rear elevation; Fig. 4, a top plan view; Fig. 5, a vertical section on the line $x\,x$, Fig. 1, looking toward the right and showing the position of the shaft in the cone-operating mechanism. Fig. 6 is an elevation of the mechanism at the right-hand end of the machine with the frame removed, showing the system of pulleys and belts for operating the various parts of the machine. Fig. 7 is a longitudinal vertical section of the cone and parts lying immediately adjacent thereto in the same vertical plane. Figs. 8 and 9 show one of the operating-gears for the cones or forming-heads in elevation and transverse sections, respectively. Figs. 10 and 11 are detail elevations of the operating mechanism for the wire-cutter. Fig. 12 is a section on the line $y\,y$, Fig. 1, showing the gears for driving the left-hand head and cone. Fig. 13 is a side elevation of the driving-pulleys. Figs. 14 and 15 are sections of the same on the line $z\,z$ of Fig. 13 when separated and when brought together to reverse the machine. Fig. 16 is an end elevation of the main drive-pulley, and Fig. 17 is a section of the same on the line $z^2\,z^2$ of Fig. 16. Figs. 18, 19, 20, and 21 are detail elevations and sections of one of the clutch-operating mechanisms. Fig. 22 is an elevation of the movable head of the spring-compressor, and Fig. 23 is a section of the same on the line $z^5\,z^5$ of Fig. 22. Fig. 24 is a diagrammatic view showing the position of the gears for driving the cones or formers, looking at them in a direction opposite to that in which the shafts are viewed in Fig. 5. Figs. 25 and 26 are enlarged top plan views of the wire-cutting mechanism, showing it out of operation and just beginning to cut the wire. Fig. 27 is a sectional view on the line $z^6$, Fig. 25. Fig. 28 is a detail plan view of the male cutter, showing its bevel or cutting edge. Fig. 29 is a detached view of the compressor with a spring in position to be compressed. Fig. 30 is a similar view with the compressor-head advanced and the spring compressed between them.

Similar letters of reference in the several figures indicate the same parts.

In the present machine, as in prior machines of this class, particularly that shown in my prior patent, No. 323,657, dated August 4, 1885, and to which reference is hereby made, I employ a pair of cones or formers, around which the wire is coiled to form the spring, and it is the aim of the present structure to simplify and improve the mechanism for operating the cones or formers, rendering the machine practically automatic, it being necessary for the operator to simply control the parts during the formation of each spring and its discharge from the machine.

In carrying the invention into practice a main frame A is provided, the particular form or construction of which is immaterial; but it is preferably provided with a series of horizontally-arranged bearings for shafts, to be presently described, and an overhanging or laterally-extending portion adapted to support a movable cone, together with part of its operating mechanism.

Referring particularly to Figs. 1, 5, and 6, it will be seen that the main drive-shaft B is journaled in the base of the machine and is adapted, through gearing to be presently described, to drive a counter-shaft B', from which both the cones or formers D D' are driven. As shown, one stationary and one movable cone is employed, and the first-mentioned—i. e., the stationary cone D—is carried by a shaft B$^4$, Fig. 7, which through gears B$^6$ B$^7$ is driven directly from the counter-shaft B', and the latter—i. e., the movable cone or former D'—is driven from said counter-shaft through the medium of gears J and K, Fig. 12. The gears J and K are mounted in recesses in the movable head H, and the shaft B' is provided with a longitudinal groove, in which a feather or key $j^8$ in a gear J slides, whereby said gear is rotated with the shaft irrespective of its longitudinal position thereon. Hence said cone or former may be shifted or moved, as desired, without being thrown out of operative connection with the counter-shaft B'. The movable cone when brought against the stationary cone is preferably held in alignment by a pin or projection $y$, and in operation, the spring being formed, is usually commenced or the end of the wire held at the base of the movable cone, which is therefore provided with means for catching and holding the end of the wire, as follows: The movable cone D' is supported in the hanger or head H by a shaft or journal $w$, to which it is connected by the pin $y$, so as to be capable of a limited longitudinal movement outward under the influence of a spring Z'. At the rear end the head H is provided with a hanger depending from the shaft B$^2$, and through this hanger a pin U, connected to the journal $w$, passes, a spring Z being interposed to force the journal forward, as will be readily understood from an inspection of Fig. 7. This pin U has a pair of lock-nuts $a\ a$ on the outer end for limiting the forward movement of the journal, and also serves as a ready means of separating the holding-jaws for the end of the wire. To accomplish this, a lever T, pivoted to a downward extension of the hanger, passes beneath the nuts and is connected at the upper end to a sliding bar S, extending through hangers for the head H to a point near the front of the head, where it is adapted to co-operate with an inclined surface of a key R, carried by a collar $q^\times$, rotating with the shaft B$^2$, but capable of a longitudinal movement thereon. When the collar $q^\times$ is moved into position for the inclined surface of the key to strike the bar S, it will be seen that through the connections described the journal is moved rearward against the tension of the spring Z and leaves a space into which the wire may be dropped.

To insure the gripping of the wire at the proper point, a gripping-jaw X, Fig. 7, having a notch in its forward end and adapted to co-operate with a jaw formed by the rear end of the cone, is connected rigidly to the journal $w$ by means of its rearwardly-extending ends, as shown, and this gripping-jaw is located at the end of the spiral formed in the cone for guiding the wire. Thus it will be seen that the jaw is opened each time the shaft B$^2$ rotates during the time the collar $q^\times$ is in operative position for the reception of the end of the wire at the moment when and place where a spring is to be started.

To facilitate and control the gripping of the wire, a crank-shaft N is journaled in the movable head, and carries at the inner end a crank O, provided with a pin $p$, entering the groove $p'$ in the collar $q^\times$, whereby when the shaft is oscillated the collar is moved into or out of operative position, and at the same time it is caused to retain its position relative to the head irrespective of the longitudinal movement of the latter. The shaft N is provided at the forward end with a handle L, by which it may be oscillated, and to assist the operator a projection $m$ is also formed on the head, beneath which he may pass his fingers while depressing the handle with his thumb, all as shown clearly in Figs. 1 and 4. The shaft B$^2$, it is obvious, may be rotated in any desired manner; but it is preferably rotated in unison with the cones or formers by means of the gear-wheels B$^6$ B$^9$ on the inner ends of the shafts B$^4$ B$^2$, respectively, as will be readily understood by an inspection of Figs. 7 and 24. When the spring has been wound on the formers, it is of course necessary that the wire should be cut at the inner end, and to accomplish this automatically the cone or rotating portion of the fixed head is provided with a female cutter $a^5$, preferably having a shank passing through the cone and shaft to unite the two and itself held in position by a set-screw $b^5$, Fig. 27. Co-operating with this cutter is a male cutter $d^4$, having a bevel or cutting edge. The cutter $d^4$ has an extended shank $d$, working longitudinally in a recess in the shaft B$^4$ and adapted to be retracted to separate the cutting-edges by a spring $e$ in the forward end of the recess.

From Figs. 7, 10, 11, 25, and 26 it will be seen that the male cutter is advanced by co-operating with the rounded forward edge of a force-bar $f$, mounted in bearings in the fixed head or frame and advanced by a second bar $g$, having a recess co-operating with its inclined rear end, as shown in Fig. 10. The bar $g$ in turn is moved by the crank $h$, mounted on a shaft $i$, journaled in the frame and having a forwardly-extending handle $j$, Figs. 5 and 11, held in one position or the other by a notched or friction spring $l$. When moved in one direction by means of the handle $j$, the crank $h$, co-operating with a pin $k$ on the bar $g$, retracts the same and advances the force-bar $f$ into position to strike the inclined rear face of the male cutter, driving the same forward and severing the wire if lying between the two cutters, as shown in Fig. 26. The force-bar is preferably located above the cone or former, and when the machine is in operation it may be advanced, and will thus remain in operative position all the while, and when the end of the spring is reached the cutter will therefore automatically sever the wire and prevent all danger of its overrunning and spoiling the free end.

To catch the rebound of the severed end of the spring, a basket composed of a series of forwardly-projecting square fingers E, united at the outer end by a tie-piece $E^2$, is located around the base of the stationary cone or former.

In operation, a wire having been placed in the gripping-jaws at the outer end of the former and the collar $q^x$ released, it is held thereby and guided by the operator's hand or otherwise in the spiral groove across the cones or formers until the inner end is reached, where it is automatically severed, as before explained. Then the operator, through mechanism to be presently described, separates the two cones or formers at the center line by sliding the movable cone along the shafts, which operation first starts the spring from the stationary cone. Then as the cones separate pressure on the movable cone is released, and under the influence of its spring Z it is moved outward or away from the gripping-jaw X, releasing the outer end of the spring automatically and as soon as the cones are sufficiently separated allowing the same to drop between them down into position for being compressed.

The mechanism through which the counter-shaft for rotating the cone derives its motion from the main power-shaft and the mechanism for separating and returning the cones to normal position is as follows: The counter-shaft B' is provided with two pulleys $C^5$ and $C^6$, which through belts, as shown in Figs. 1 and 6, are driven from pulleys $C^2$ and $C^3$, rotating in unison with the main drive-pulley C. The pulley $C^6$ is normally loose on the shaft B', and its belt is crossed to reverse its direction of rotation; but under normal conditions it is not in operation. When, however, it becomes necessary or desirable to reverse the machine or check it suddenly to unwind the wire or relieve the operator in case he should get caught in the mechanism, it serves as a ready means for accomplishing these results. On its inner side it is provided with a cone friction-surface $C^9$, adapted to co-operate with a similar groove $C^{10}$ in the pulley $C^5$, so that its motion may be reversed. The shaft B' is provided with a collar $i^{10}$, Fig. 19, having cam-surfaces on one side, with a smooth surface on the opposite side adapted to bear against the pulley $C^6$, and co-operating with this collar is a similar but oppositely-arranged collar $i^2$, carried in a box on the end of the crank-arm $h^2$ and prevented from independent rotation by set-screws $k^2$. The collar $i^{10}$ has a limited longitudinal movement on the shaft; but is prevented from rotation by a set-screw $i^{11}$, or otherwise, and it will now be readily understood that as the collar $i^2$ bears against the collar $i^{10}$, with the cam-surfaces in contact, when the cam crank-arm $h^2$ is turned in one direction or the other the pulley $C^5$ will be forced against the pulley $C^6$, and if the belt of $C^5$ be simultaneously loosened it will be caused to rotate backward and carry the counter-shaft B' with it.

To move the crank and simultaneously loosen the belt of pulley $C^5$, a foot-treadle $u$ is provided on the end of a foot-lever $u^9$, pivoting on shaft $q^2$ and having at the upper end a link $s^3$, connected to the end of a crank-arm $u^3$, carried by a rock-shaft $N^2$, Fig. 5, on which rock-shaft is another crank-arm $u^4$, Fig. 6, carrying at its end a link $o^4$, provided with a belt-tightener pulley $v$, co-operating with the belt for driving the pulley $C^5$.

Moving with the crank-arm $u^4$, and preferably connected to the journal of the belt-tightener pulley, is a link $s^5$, united to one end of a lever $u^5$, journaled on a shaft $v^{10}$, and having its opposite end connected to the crank-arm $h^2$ for operating the cam by means of a link $s^6$. Thus the operator may through the treadle either tighten the belt for driving pulley $C^5$ or by an opposite movement loosen said belt and simultaneously force the pulley $C^6$ into frictional contact therewith and instantly reverse the machine or stop the same much more quickly than would otherwise be possible.

Above the cones or formers or the heads carrying the same, and preferably rotating in a plane parallel with the plane of the longitudinal movement of said head, is a large drum or pulley I, having a crank-arm and a link $s$, connecting said arm and the movable head, as shown in Fig. 3. Passing around this drum I is a flexible connection or rope $q$, one end of which is attached to a spring-actuated drum $r$, adapted to turn the drum or pulley I in one direction, and the opposite end of said rope or flexible connection is connected to a pulley $o$, loosely mounted on shaft $B^3$ and adapted to be rotated at desired intervals to turn the drum I in the opposite direction and through said drum I to move the movable head H, carrying the movable former, longitudinally on its supporting-shaft.

The shaft $B^3$, upon which the pulley $o$ is mounted, carries a pulley $C^7$, connected through a belt with a pulley $C^4$, carried by the drive-shaft and adapted to be rotated in unison with the pulleys $C^2$ $C^3$. The belt for driving the pulley $C^7$ is kept normally under tension by a belt-tightener pulley $a^2$, hung on the shaft $b^2$ and drawn inward by a weight W through a lever-and-link connection $w^9$, as shown in Fig. 5. This keeps the shaft $B^3$ rotating at all times while the machine is in operation; but the pulley $o$ is loosely mounted thereon and is adapted to be connected therewith through the medium of a friction-drum $p$, Fig. 5, keyed to the shaft.

The arrangement for throwing the pulleys $o$ $p$ into contact is similar to that described in connection with the pulleys $c^5$ $c^6$—that is to say, a cam crank-arm $h^2$ is adapted to operate a pair of cam-collars similar to $i^2$ $i^{10}$, and therefore not requiring to be illustrated. Both crank-arms are seen in Fig. 4. To the end of the cam crank-arm $h^2$, to connect pulleys $o$ and $p$, a link $u^2$ is connected, which through a lever $t^2$, link $s^2$, and crank-arm $r^2$ is connected to the shaft $q^2$. The shaft $q^2$ at the left-hand end in position for operation by the operator's left foot carries a foot-lever $m$. Thus the operator by moving his left foot may throw the pulley $o$ into connection with its operating-shaft and through it cause a movement of the flexible connection $q$, drum I, and movable head and former to cause a separation of the heads and discharge of the spring, as before described.

Inasmuch as it is desirable and necessary to the successful operation of the machine that the two forming-heads shall rotate in unison and bear a certain definite relation to each other, it becomes necessary to devise a means whereby the gears for driving the same may be adjusted on the shafts and with relation to each other, and for this purpose the structure shown in Figs. 8 and 9 is preferably adopted, wherein $e^2$ is a friction cone or collar keyed to the shaft in any suitable manner, and $d^2$ a gear-wheel corresponding to the gears $B^6$, $B^7$, or $B^9$, cored out to fit the friction-cone keyed to the shaft.

On the opposite side of the gear-wheel $d^2$ and preferably supporting the same away from the shaft is a collar $c^2$, adapted through the medium of nuts $f^2$ on the shaft or otherwise to press the collar against the gear-wheel and force the latter into intimate contact with the friction-cone keyed to the shaft. With this arrangement should it become necessary to adjust the relative position of the gear-wheel or shafts with relation to each other it is easily and quickly accomplished by loosening the collar $c^2$, adjusting the wheel to the point desired, and again tightening the collar to lock the parts rigidly in position.

To provide against possible exigencies and to prevent breakage of the machine in case of sudden retardation or stoppage, the main drive-pulley is preferably connected with the pulleys $C^2$ $C^3$ $C^4$ by cone friction-surfaces $C^{12}$, Fig. 17, and said pulleys $C^2$ $C^3$ $C^4$ are therefore loose on the shaft, being forced outward by the spring $g^2$. To force the pulleys together, the cam-collar arrangement described in relation to pulleys $C^5$ $C^6$ is employed and the contact is maintained by a weight $t$, pivoted on the end of the lever $t^8$, connected by link $t^9$ with the end of the cam-lever $h^2$, Fig. 6. This holds the parts in operative position under normal condition; but should extraordinary resistance be offered to the running of the machine it would permit the drive-pulleys to slip, and thus prevent breakage of the more delicate parts.

In the preferred form of the machine a basket or cradle for the reception of the springs when dropped from the forming heads or cones is preferably provided, consisting, essentially, of the three shafts $o^2$, $o^3$, and $p^2$, the latter constituting the gate or bottom of the cradle and having a limited lateral movement to open the cradle and permit the spring to fall through, for which purpose it is mounted in the ends of crank-arms or hangers $d^3$, carried by shaft $o^2$. Shaft $o^2$ has in its outer end an operating-arm $c^3$, adapted when elevated to rest on the end of a wedge-shaped projection $c^9$, moved by a shaft $b^3$, whereby the shaft $p^2$ is held in position to form the basket or cradle.

Mounted on the shafts $o^3$ $o^2$ is a movable compressor-head $m^2$, which, co-operating with the stationary compressor-head $m^3$, compresses the spring, as will be presently described. The movable compressor-head is connected to one end of a flexible connection or rope $y^2$, passing around guide-pulleys $x^2$ $v^5$, and is connected to the drum or grooved pulley $w^2$, running loosely on the end of shaft B. The opposite end of the flexible connection $y^2$, or the end extending beyond the movable compressor-head, is connected to a spring-drum $g^3$, serving to bring the compressor-head back to the position shown in Fig. 1.

On the end of shaft B, outside of the drum $w^2$, is a friction-disk $v^2$, and just inside of said drum $w^2$ is a cam-clutch-actuating mechanism similar to that described in connection with pulleys $C^5$ $C^6$, and through its cam-arm $h^2$ it is operated by the foot-pedal $m^×$ through the link $u^2$, lever $t^2$, link $s^2$, and crank-arm $s^2$.

Each of the compressor-heads is provided with a spring-holder consisting of a series of wings mounted on a central boss or collar $n^3$ and conforming approximately to the shape of the spring to be compressed. The wings cause the coils of the spring to properly distribute themselves during the compressing operation, and as the heads approach each other the wings and bosses retreat to the position shown in Fig. 30, allowing the flat faces of the heads to come together. These wings and bosses are prevented from becoming loose by friction-springs $n^9$. The spring-holder in the stationary head is, furthermore, pressed outward by a spring $n^{10}$, Fig. 29, whereby as the movable head retreats it is forced outward, and as the movable head reaches the extreme of its outward movement the boss thereon coming in contact with the frame or some stationary portion thereof is caused to move through the head into normal position, as will be readily understood.

In its travels to and fro the movable head is adapted to control the opening and closing of the basket or cradle by means of a rod $b^3$, having a stop $a^3$, adjustably mounted thereon near its inner end and a stop $h^3$ near its outer end, with both of which the movable head is adapted to contact and move the rod $b^3$ in or out, as the case may be. When the head is at the inner extreme of its movement, it strikes the stop $a^3$, moves the rod $b^3$ inward, and releases the operating-arm $c^3$ of the lower shaft or gate $p^2$, allowing said gate to swing outward, and when said head reaches the outer extreme of its movement after releasing the spring and allowing it to drop through the cradle it strikes the stop $h^3$, moves the rod $b^3$ and the inclined projection $c^9$ thereon outward, again elevating the arm $c^3$ and closing the basket for the reception of another spring.

In operating this part of the machine the operator presses with the heel of his left foot on pedal $m^\times$, turning rock-shaft $q^2$, on the end of which the lever $r^2$, Fig. 5, is mounted. This operates levers $s^2$, $t^2$, and $u^2$, and through these the handle $h^2$ of the clutch-actuating mechanism for the pulleys $v^2$ and $w^2$, causing the round belt $y^2$ to draw the compressor-head inward against the tension of the spring in the drum $g^3$. While the compressor-head is in motion, the spring-holders $n^3$ $n^3$ hold the spring in proper position, and as the heads approach the male spring-holder enters the female spring-holder $n^3$ as far as the shoulder, and the force of the spring which is being compressed throws the flanges on each spring-holder through the slots $f^3$, Fig. 22, and also throws the spring-holder $n^2$ into the position shown in Fig. 30. Just before the compressor-head $m^2$ reaches $m^3$ it strikes the stop $a^3$ and allows the rod to swing outward. The operator now releases the heel-pressure on the pedal, disconnects the friction-wheel, and the spring-pulley $g^3$ winds up the flexible connection $y^2$, drawing back the movable head, which latter as it reaches the outer extreme of its movement returns the operating-handle $c^3$ and rod $p^2$ to its former position.

The operation of the machine is as follows: The operator presses with his right heel on pedal $u$, which, by means of link $s^3$, lever $u^3$, rock-shaft $N^2$, lever $u^4$, and link $o^4$, draws the belt-tightener pulley $v$ tight against the belt of $C^2$ and $C^5$ and starts the machine. Then with wire in hand he presses it close to the left-hand shoulder of cone $D'$, and taking hold of handle or knob $m$ presses down thumb-latch L on crank-shaft N. As the collar $q^\times$ revolves and the inclined key R strikes bar S the lever T draws out the mandrel $w$ and the piece X attached to it enough to let the end of the wire enter the notch $b$ in piece X. When the key R passes by the bar S, the spring Z throws back the mandrel and the piece X into their former position, and the wire is caught. When the operator feels the wire is caught, he releases the thumb-latch L on crank-shaft N. The operator still holds the wire in his hand, and the wire follows the grooves in the two cones until it reaches the right-hand shoulder of cone D, where it is cut by the cutter $d$, which has already been placed in operative position, as before described. The cut-off wire, which has now become a spring, is held by the basket E until its rebound or reaction is ended. The operator then presses with his toe on pedal $m$, which is attached to rock-shaft $q^2$ and lever-arm $r^2$, which operates the lever combination $s^2$, $t^2$, and $u^2$, operating, as shown by the arrows in Fig. 5, to operate mechanism actuating a clutch, as before described, on counter-shaft $B^3$, and setting in motion loose pulley $o$, to which one end of round belt $q$ is attached. This round belt is fastened on pulley I. When pulley $o$ is put in motion, pulley I is moved to the left and by its arm-link $s$ draws back cone $D'$ to the left, allowing the spring to drop into the compressor, which is immediately under it. The operator then removes the pressure of his left foot from pedal $m^\times$, when pulley $o$ is no longer actuated and cone $D'$ is returned to its former position by the round belt $q$ being wound upon spring-wheel $r$, thus reversing the previous action of wheel I and arm-link $s$. This allows the spring to drop down into the compressing-cradle, when the compressing operation before described takes place.

The machine as a whole, it will be noted, is simple and the mechanical parts are such as to permit of great speed in the formation of springs. It will be particularly noted that the length of the frame is reduced, in order to allow which the movable head H is provided with bearings surrounding the shafts $B'$, $B^2$, $B^4$, and $B^5$ and projecting in the same direction as the forming-cone. This allows of an extended bearing to prevent lateral movement of the cone, and at the same time the movable head H may be run out to the end of the frame, no additional space being necessary for the accommodation of the bearings.

Having thus described my invention, what I claim as new is—

1. In a machine for forming spiral springs, the combination, with the rotary longitudinally-movable forming-head held advanced by yielding pressure, of the power-shaft and gearing connecting said head and power-shaft to retract the head and a shifting connection in said gearing under the control of the operator, whereby the head may be moved back at the will of the operator, substantially as described.

2. In a machine for forming spiral springs, the combination, with the rotary longitudinally-movable spring-pressed forming-head, of the power-shaft, gearing connecting the head and power-shaft, and a clutch under the control of the operator interposed in said gearing, whereby the head may be moved back against the tension of its spring, substantially as described.

3. In a machine for forming spiral springs, the combination, with the rotary longitudinally-movable spring-pressed forming-head, of a drum and flexible connection for moving the head against the tension of its spring, a power-shaft, and a clutch under the control of the operator interposed between the power-shaft and drum, whereby it may be rotated and the head moved, substantially as described.

4. In a machine for forming spiral springs, the combination, with the rotary longitudinally-movable spring-pressed forming-head and the pulley having a lever-arm connected with said head, of the flexible connection passing around said pulley, the drum to which said flexible connection is secured, a power-shaft, and a clutch interposed between said power-shaft and drum, whereby the head may be moved against the tension of its spring, substantially as described.

5. In a machine for forming spiral springs, the combination, with the rotary longitudinally-movable forming-head and the pulley having the lever-arm connected with said head, of the flexible connection passing around said pulley, the spring-drum, to which one end of said connection is secured, the loose drum, to which the opposite end of said connection is secured, a power-shaft, and a clutch under control of the operator interposed between said last-mentioned drum and power-shaft, substantially as described.

6. In a machine for forming spiral springs, the combination, with the hanger or head, of the rotary forming-cone carried thereby and having a limited longitudinal movement and wire-gripping jaws at the base of said cone adapted to be opened by the longitudinal movement of the cone, substantally as described.

7. In a machine for forming spiral springs, the combination, with the hanger or head and the rotary forming-cone carried thereby and having a limited independent longitudinal movement, of a wire-gripping jaw at the base of said cone movable independently of the cone and adapted to co-operate with a jaw on the base of the cone, substantially as described.

8. In a machine for forming spiral springs, the combination, with the hanger or head and the rotary forming-cone carried thereby and having a limited independent longitudinal movement, of a wire-gripping jaw mounted in the hanger or head, movable independently of the cone and co-operating with a jaw on the base of the cone, and a spring for holding said movable jaw projected, substantially as described.

9. In a machine for forming spiral springs, the combination, with the hanger or head, the rotary forming-cone carried thereby and having a limited longitudinal movement, and the spring for holding said cone outward, of a movable wire-gripping jaw mounted in the hanger or head, movable independently of the cone, a spring for advancing said jaw, and a hand-lever for retracting the same, substantially as described.

10. In a machine for forming spiral springs, the combination, with the longitudinally-movable hanger or head, the rotary forming-cone carried thereby, the gripping-jaw rotating with said cone, and the shaft lying parallel with said head, of the collar mounted on said shaft for operating the gripping-jaw, whereby the gripping-jaw may be operated, substantially as described.

11. In a machine for forming spiral springs, the combination, with the longitudinally-movable hanger or head, the rotary forming-cone carried thereby, the gripping-jaw rotating with said cone, and the shaft lying parallel with said head, of the longitudinally-movable collar mounted on said shaft for operating the gripping-jaw and the hand-lever for moving said collar into operative position, substantially as described.

12. In a machine for forming spiral springs, the combination, with the oppositely-arranged rotary heads having a relative longitudinal movement and the wire gripping-jaws carried by one head, of the co-operating cutting-jaws mounted directly on and rotating with the opposite head, and the movable force-bar mounted in stationary bearings co-operating with the cutting-jaws to close the same and sever the wire, and mechanism under control of the operator for moving said bar, substantially as described.

13. In a machine for forming spiral springs, the combination, with the rotary forming-head having the pair of co-operating cutting-jaws mounted on and rotating with the said head, of the movable force-bar mounted in stationary bearings co-operating with the jaws to close the jaws, the bar $g$, and the crank-shaft and crank controlled by the operator for operating said bar $g$, substantially as described.

14. In a machine for forming spiral springs, the combination, with the longitudinally-movable hanger or head, the rotary forming-cone carried thereby, and the wire-gripping jaw at the base of the cone, of the rod $n$, connected with the jaw, the lever T, co-operating with the rod, the bar $s$, engaging the lever, the collar $q^x$, having the incline engaging the bar, and the rotary shaft $B^2$, carrying the collar, substantially as described.

15. In a machine for forming spiral springs, the combination, with the longitudinally-movable head carrying the forming-cone with the gear-wheel for rotating the cone journaled in the head, of the counter-shaft and the gear rotating with but longitudinally movable on said shaft and in mesh with the cone-driving gear, substantially as described.

16. In a machine for forming wire springs, the combination, with the counter-shaft and forming-cones, of the gears for driving the cones from the counter-shaft cored out on one side, the friction-cone keyed to the shaft and fitting in said gear, and the collar fitting on the opposite side of the gear, substantially as described.

17. In a machine for forming wire springs, the combination, with the forming-cones and driving mechanism, of a controlling mechanism consisting of the clutch-surfaces and the longitudinally-movable collar for moving said clutch-surfaces, a rotary collar having cam-surfaces co-operating with the surfaces of the longitudinally-movable collar, and an operating-handle for moving said rotary collar, substantially as described.

18. In a spring-machine, the combination, with the forming-cones and drive-shaft, of a reversing-gear interposed between the cones and drive-shaft, consisting of the fast and loose pulleys, the belts passing from the drive-shaft around said pulleys, one being crossed to drive its pulley in the opposite direction, a clutch-operating mechanism for moving said fast and loose pulleys into engagement, and a belt-tightener normally co-operating with the belt of the fast pulley and moving in unison with the clutch-operating mechanism, whereby the tension on said belt is released and the pulleys thrown into engagement simultaneously, substantially as described.

19. In a machine for making spiral springs, the combination, with the compressor-cradle formed by the three shafts and the compressor-head movable longitudinally on said shafts, of a drive-shaft gearing between said head and shaft and a clutch interposed in said gearing and under the control of the operator, substantially as described.

20. In a machine for forming spiral springs, the combination, with the cradle and movable compressor-head, of the spring for retracting said head, the drive-shaft, a drum having a clutch connection with said shaft, and a flexible connection between the drum and compressor-head, substantially as described.

21. In a machine for forming spiral springs, the combination, with the cradle having the laterally-movable gate, with its operating-arm and the longitudinally-movable compressor-head, of the longitudinally-movable shaft having the incline controlling the operating-arm of the gate and having the projections thereon in the path of the movable head, whereby the movement of said head opens or closes the gate, substantially as described.

PETER FRASER.

Witnesses:
CHAS. H. DREW,
JOHN L. MCLEAN.